E. S. TURNER.
Weather-Vane.

No. 215,028.　　　　　Patented May 6, 1879.

Witnesses
Frank A. Powers
Wm Hendley

Inventor
Edward S. Turner

UNITED STATES PATENT OFFICE.

EDWARD S. TURNER, OF CHICAGO, ILLINOIS.

IMPROVEMENT IN WEATHER-VANES.

Specification forming part of Letters Patent No. 215,028, dated May 6, 1879; application filed January 10, 1878.

*To all whom it may concern:*

Be it known that I, EDWARD S. TURNER, of Chicago, in the county of Cook and State of Illinois, have invented certain new and useful Improvements in Weather-Vanes; and I do hereby declare the following to be a full, clear, and exact description thereof, reference being had to the accompanying drawings, and to the letters of reference marked thereon.

The nature of my invention relates to weather-vanes; and it consists in constructing the tail or tail end of the vane in skeleton or frame form, with glass inserted in such frame, as will be hereinafter more fully set forth.

In order to enable others skilled in the art to which my invention appertains to make and use the same, I will now proceed to describe its construction and operation, referring to the annexed drawings, which form a part of this specification, and in which—

Figure 1:
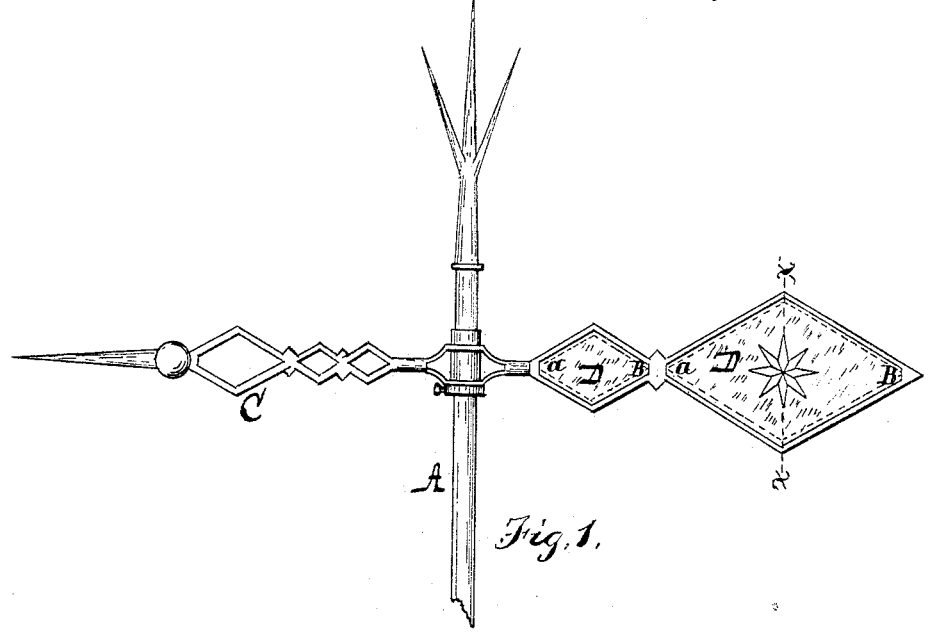
Figure 2:
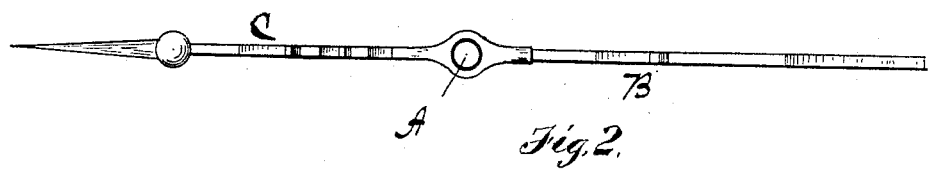
Figure 4:
Figure 3:
Figure 5:
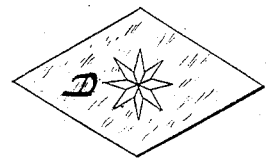

Figure 1 is a side elevation of a weather-vane embodying my invention. Fig. 2 is a plan view of the same. Figs. 3, 4, and 5 are detailed views of parts thereof.

A represents a section of a lightning-rod and point, with a weather-vane thereon of my construction. C is the point, and B the tail, of the weather-vane, placed on the rod A in the usual manner. The tail B of the vane is made in open skeleton form, of diamond or other suitable shape, having suitable rabbets or shoulders at $a$ around the inside of the opening or openings in the skeleton frame. In such opening there is inserted a pane of glass, D, of suitable form to fit on and be secured in the rabbet $a$ in any of the known and usual ways for securing glass in a metal frame.

The glass pane D may be either plain or fancy, as may be desired.

Weather-vanes, as heretofore constructed, soon tarnish and become unsightly; but by my construction, of using glass in a metal frame, they retain their appearance unchanged for many years, thus presenting a beautiful ornament at all times. Besides, by making the tail of the vane in skeleton form, I secure a more even distribution of metal on opposite sides of the rod for the transmission of currents of electricity to the rod.

Having thus fully described my invention, what I claim as new, and desire to secure by Letters Patent, is—

1. A metallic weather-vane having its tail B made in skeleton form, with one or more panes of glass, D, inserted therein, for the purposes herein set forth.

2. The metallic weather-vane B C, having its tail B made in skeleton form, with rabbets or shoulders $a$ around the inside of the openings, in combination with one or more panes of glass, D, inserted and fastened therein, substantially as and for the purposes herein set forth.

EDWARD S. TURNER.

Witnesses:
  FRANK A. POWERS,
  JOHN HENDLEY.